INVENTOR.
LEONARD A. ERICKSON
BY—MAHONEY, MILLER & RAMBO
BY— W. S. Rambo
ATTORNEYS Oct. 17, 1961 L. A. ERICKSON 3,004,689
MACHINE FOR FORMING PAPER CAPS
Filed May 13, 1960 9 Sheets-Sheet 7

INVENTOR.
LEONARD A. ERICKSON
BY- MAHONEY, MILLER
& RAMBO
BY- W. S. Rambo
ATTORNEYS.

INVENTOR.
LEONARD A. ERICKSON
BY- MAHONEY, MILLER
& RAMBO
BY- *W. H. Rambo*
ATTORNEYS.

United States Patent Office 3,004,689
Patented Oct. 17, 1961

3,004,689
MACHINE FOR FORMING PAPER CAPS
Leonard A. Erickson, Columbus, Ohio, assignor, by mesne assignments, to Paperlynen Company, Columbus, Ohio, a corporation of Ohio
Filed May 13, 1960, Ser. No. 28,928
24 Claims. (Cl. 223—7)

This invention relates to a machine for forming paper caps. It has to do, more particularly, with a machine for forming paper caps of the kind that consist of an annular head-fitting band and a square crown inserted within the upper edge of the band and secured therein by folding the upper edge of the band and the outer edge of the crown together.

The machine of the this invention is an improvement over the cap-forming machine disclosed in the Patent No. 2,313,628 issued to Edmund J. DeVillers, on March 9, 1943. More specifically, it is an improvement on the mechanism of that machine which inserts the square crown in the annular band and secures it in position by interfolding the adjacent edges of the band and the crown.

According to the present invention, the mechanism for inserting the crown into the band and folding the band around the crown to secure them together is improved whereby a better folded connection between the cooperating edges of the band and the crown is obtained. This mechanism is such that the entire edge of the crown will be folded within the edge of the band so that there will be no loose unconnected edge portions of the crown. Since the band is annular and the crown is square, this connecting by folding is difficult, but the improved mechanism of this invention will perform this operation efficiently and effectively without leaving any loose, unconnected portions of the crown. Also, the improved mechanism will perform the operation neatly without leaving unsightly wrinkles or bunches of material at the folded connection.

In the accompanying drawings there is illustrated the improved crown-inserting and folding mechanism of this invention in conjunction with a cap-forming machine having the general structure of the machine disclosed in Patent No. 2,313,628. Only sufficient details of the patented machine are disclosed herein for an understanding of the improved mechanism of this invention and for details of the entire machine, attention is called to the disclosure of said patent.

In the drawings:

FIGURE 5 is an enlarged axial horizontal sectional view taken along line 5—5 of FIGURE 2 through the rear portion of the head control mechanism.

FIGURE 16 is a detail in enlarged section taken along the line 16—16 of FIGURE 13.

Figure 26:
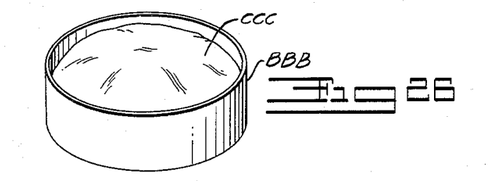
FIGURE 26 is a perspective view of the finished cap produced by the improved machine of this invention.

With reference to the drawings, before describing the cap-forming machine, the cap produced by the machine will be described since it is believed that this will aid in an understanding of the machine. This cap is illustrated in FIGURE 26 and is shown as comprising a head-engaging portion or band BBB of annular form and an inserted crown CCC which is disposed within the band, the adjacent edges of the band and crown being interfolded by the machine to permanently connect them together.

The successive steps in producing the finished cap are illustrated in FIGURES 21 to 25, inclusive, and reference thereto will also aid in understanding the machine to be subsequently described. A strip of paper or other flexible material is indicated by the reference character S in these drawings and, as described specifically in Patent No. 2,313,628, is subjected to various operations to prepare it for the folding operations illustrated in FIGURES 22 to 25. These operations include the formation of weakened fold lines F, such as by scoring, that extend longitudinally of the sheet S in predetermined spaced parallel relationship. After the fold lines F are formed, the strip S is coiled about a drum, as described specifically in said patent, to form the cap band blank shown in FIGURE 21 with its ends secured together to provide an annular blank having the fold lines F adjacent the one edge L of the blank, which will eventually be folded upwardly within the lower edge of the band BBB of the finished cap, and having the fold lines F adjacent the other edge U of the blank, which will eventually be folded downwardly within the upper edge of the band BBB of the finished cap, and will be interfolded with the crown CCC of the finished cap. The edge L of the blank to the left of FIGURES 21 to 26 will be referred to as the lower edge while the edge U to the right in those figures will be referred to as the upper edge which correspond to the respective positions they occupy in the completed cap of FIGURE 26.

Figure 1:
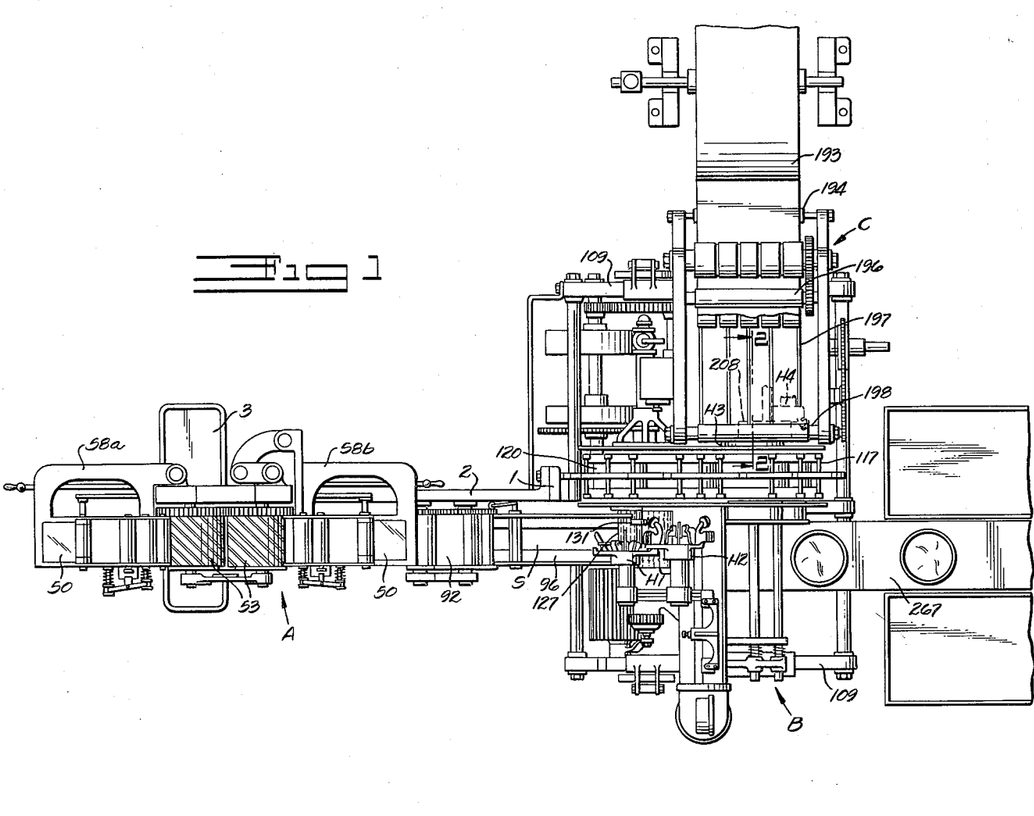
FIGURE 1 is a plan view, partly broken away, of the general cap-forming machine in which this invention is embodied.
Figure 22:
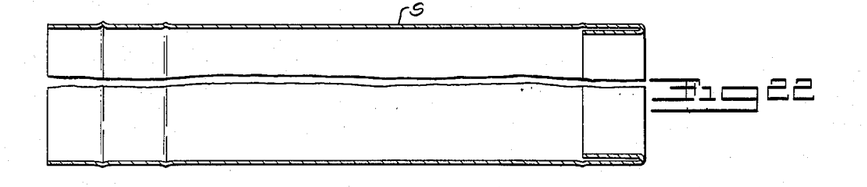
FIGURE 22 is a similar view showing the first fold in the band blank.
Figure 23:
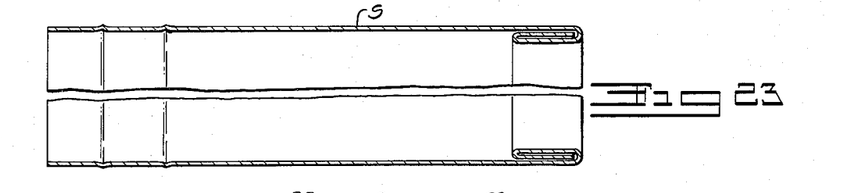
FIGURE 23 is a view similar to FIGURE 22 showing the second fold in the band blank.

In FIGURE 22, there is illustrated a folding operation which is performed by the first folding head of the patented machine and which is designated $H_1$ in the patent and in FIGURE 1 of the drawings of this application. This head $H_1$ folds a flap inwardly or downwardly along the uppermost fold line F. The next fold operation is performed by a folding head $H_2$ of the patented machine, and illustrated herein in FIGURE 1, and as illustrated in FIGURE 23, comprises folding inwardly or downwardly along the next or innermost fold line to provide a double flap or flange at the upper end of the band blank.

Figure 24:
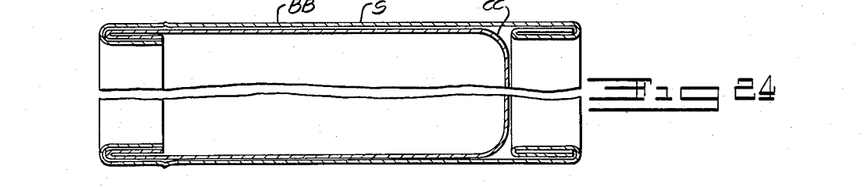
FIGURE 24 is a view similar to FIGURE 23 but showing the cap crown blank inserted in the band blank and partially folded therewith, these operations having been performed by the improved crown blank inserting and folding head of this present invention.

The next operation is indicated in FIGURE 24 and comprises inserting the crown sheet or blank CC and folding its edge within the lower edge of the band blank. The fold is made along the lowermost fold line F and as the flap is folded inwardly or upwardly it is folded over the adjacent edge of the inserted crown blank CC. The blank produced by these operations will appear as in FIGURE 24 and this general type of blank is produced at the head $H_3$ in the patented machine and the location of which is indicated generally in FIGURE 1. However, the head $H_3$ of the present invention for inserting the crown blank CC into the band blank BB is an improved mechanism which more effectively inserts the crown blank CC and folds the lower edge of the band blank around the adjacent edge of the crown blank and is shown in detail in FIGURES 2 to 20 of the attached drawings. As previously indicated, the insertion of the crown blank, which is of square form, into the annular band blank and the joining of the adjacent edges is difficult. The improved head mechanism located at $H_3$ in the machine disclosed herein will perform this operation more efficiently than the head mechanism $H_3$ of the patented machine, will insure that the edges are folded together all around the band and will prevent the formation of unsightly wrinkles or bunches of material at the folded connection.

Figure 25:
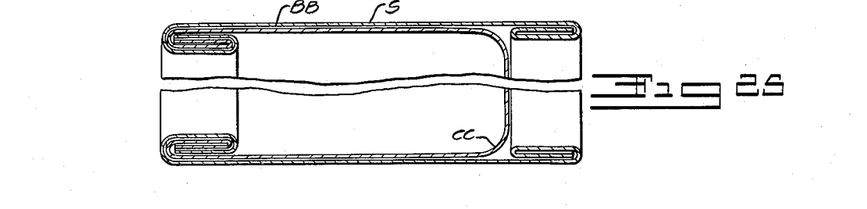
FIGURE 25 is a view similar to FIGURE 24 but showing the final interfolded cap crown and band.

After the blank of FIGURE 24 is produced by the improved head $H_3$ of this invention, it is finished to the condition indicated in FIGURE 25 by the head $H_4$ indicated herein in FIGURE 1 which is the same as that disclosed in the patented machine. By this operation, the lower edge of the band blank BB is folded inwardly or upwardly over the adjacent innermost fold line F. In this operation, the edge of the crown blank CC is interfolded with the inwardly folded flap of the band blank BB.

From the above, the folding operations to be performed successively to produce the cap will be more readily understood. The machine for producing these folds, including the improved crown inserting and crown blank and band blank folding head $H_3$ will now be described.

In FIGURE 1, the general structure of the entire cap-forming machine is illustrated. As disclosed specifically in Patent No. 2,313,628, the machine comprises a material preforming, cutting and feeding section A and a cap-forming section B. The section A is a straight line substantially horizontally disposed table-like section which leads to the right as viewed in FIGURE 1, into the section B at one end thereof, the section B being an upright vertically disposed section. The section A may be exactly as that shown in said patent and will have a supply of the band-forming strip S mounted thereon. During passage through this section A, the strip S will be prepared by printing or other desired operations, will be provided with the fold lines F, and will be cut into desired lengths so that such lengths can be subsequently coiled or curled into a cap band blank of annular form. The section A will not be described in detail but certain parts thereof will be identified by reference characters similar to those used in the patent disclosure so that this present disclosure can be related readily to the patent disclosure. Thus, the section A has a frame identified at 2 and which is supported by means including the laterally projecting part 3. The frame 2 is suitably joined to the frame of the section B at the rigid connection 1.

The section A includes the reservoir 50 for printing ink, a plurality of printing rollers 53, and inking units 58a and 58b for supplying ink to the printing rollers 53. After being printed and otherwise prepared as described in said patent, including the formation of the fold lines F shown in FIGURE 21, the strip S is severed into desired band-forming lengths by a set of rollers 92 as described specifically in said patent. After leaving the rollers 92, the severed length of the strip S passes into and through an inclined slide 96, as described in said patent, and at this time the strip leaves the material preparing section A of the machine and enters the cap-forming section B of the machine.

As the length of the strip S leaves the slide 96, as described in said patent, it enters the cap forming section B of the machine where the cap band blank is curled or coiled into annual form, is folded along the fold lines F and the crown sheet or blank is inserted and interfolded with the cap blank, by the steps indicated in FIGURES 21 to 25 which were referred to previously.

The section B of the machine includes the upright frame sections 109 between which a turret 117 is mounted for rotation about a horizontal axis. The turret is rotated in a vertical plane, intermittently and indexed by any suitable mechanism such as by the Geneva drive mechanism disclosed and described in said patent. It is provided with a plurality of nests or molds 120 which are of tubular form and open at both sides of the turret. When the turret is at rest, one of the molds 120 will be in registration with a drum 127 which is at the discharge end of the slide 96. As described in said patent, the drum 127 is mounted for rotation and its axis of rotation is slightly below the slide 96 in order to locate the upper surface of the drum 127 in position to receive the prepared and severed lengths of the strip S discharged from the slide 96. Rollers 131 are provided adjacent the drum 127 and will serve to guide the strip into engagement with the drum. These rollers 131 will further cooperate with the rotatable drum 127, as described in detail in said patent, to coil the strip length around the drum, with the ends overlapped. Thus, each length of the strip S will be completely coiled on the drum 127 into a collar-like cap band blank as the drum 127 rotates. Then the rollers 131 will move away from the drum 127 and, as described in said patent, the drum will then be moved into the axially aligned mold 120 on the turret 117, where the coiled strip length is released from the drum and is positioned within the mold and is suitably held therein After the turret 117 advances to its next position, the mold 120, in which the annular band blank is held, will receive the folding head H₁ which will cooperate therewith in the manner described in said patent to form the first fold indicated in FIGURE 22 referred to previously. After the head H₁ is withdrawn from the mold 120, the turret 117 is again moved one step to register the mold 120 with a second folding head H₂ which will perform the folding operation indicated in FIGURE 23. It will be apparent that the heads H₁ and H₂ are at the same side of the turret 117 since they act to fold the one edge U of the cap blank that is the edge which will eventually be the upper edge. The heads H₁ and H₂ are identical to those described in said patent and function in an identical manner to produce the two folds shown in FIGURES 22 and 23.

The turret 117 is now advanced another step where the crown blank inserting and folding operation illustrated in FIGURE 24 is to be performed by a head H₃. This head is an improved structure according to this invention and will subsequently be described in detail. Since this head H₃ will insert the crown sheet or blank at the lower edge L of the band blank and fold that edge, it will be located at the side of the turret 117 opposite to that side where the heads H₁ and H₂ are disposed, as shown in FIGURE 1. As explained in said patent, prior to the movement of the head H₃ into the aligning mold 120, a crown sheet or blank is cut from a supply and is positioned between the head and the mold by mechanism indicated generally at C in FIGURE 1. The supply of crown material is shown as a roll 193 of crepe paper or other suitable flexible crown-forming material. The strip extends from the roll 193 over a roller 194 and then between a set of cut-off rollers 196. After the crown sheet or blank CC has been cut from the supply, it will be of substantially square outline and will move downwardly over an inclined surface 197, as described in said patent, and between the sheet timing and feeding rollers 198. When the sheet CC is released by these rollers, it will drop edgewise downwardly to a point in registry with the head H₃ and the aligning mold 120, as described in said patent, and as will be apparent hereinafter from the specific description of the improved head H₃.

After the crown sheet or blank CC has been positioned within the mold 120 and the edge of the band blank BB has been folded around the edge of the crown sheet, the head H₃ is removed from the mold, and the turret 117 is advanced another step to position the mold in registration with the head H₄ which performs the final folding operation illustrated in FIGURE 25. This head H₄ is on the same side of the turret at which the head H₃ is disposed, as indicated in said patent. The head H₄ is identical to the one disclosed in said patent and operates in an identical manner to perform the final fold illustrated in FIGURE 25.

After the final folding operation has been completed and the head H₄ is withdrawn from the mold 120, the turret 117 advances the mold to a cap-discharging position. At this discharge position, a pusher member 208 will move through the mold 120 causing the completed cap to be ejected as described in said patent. When the pusher 208 has been withdrawn from the mold 120, the turret 117 will advance another step and move this mold into registry with the drum 127 for reception of the coiled length of the strip S in the drum 127 at that time and the complete cycle of operation of the turret will again be repeated. After the caps have been completed and have been ejected from the turret 117 by the pusher 208, they are moved away from the machine on a conveyer belt 267 which extends to the right of the machine as viewed in FIGURE 1.

As indicated previously, the improved crown inserting and band folding head H₃ of this present invention and associated mechanism is illustrated in detail in FIGURES 2 to 20, inclusive.

Figure 2:
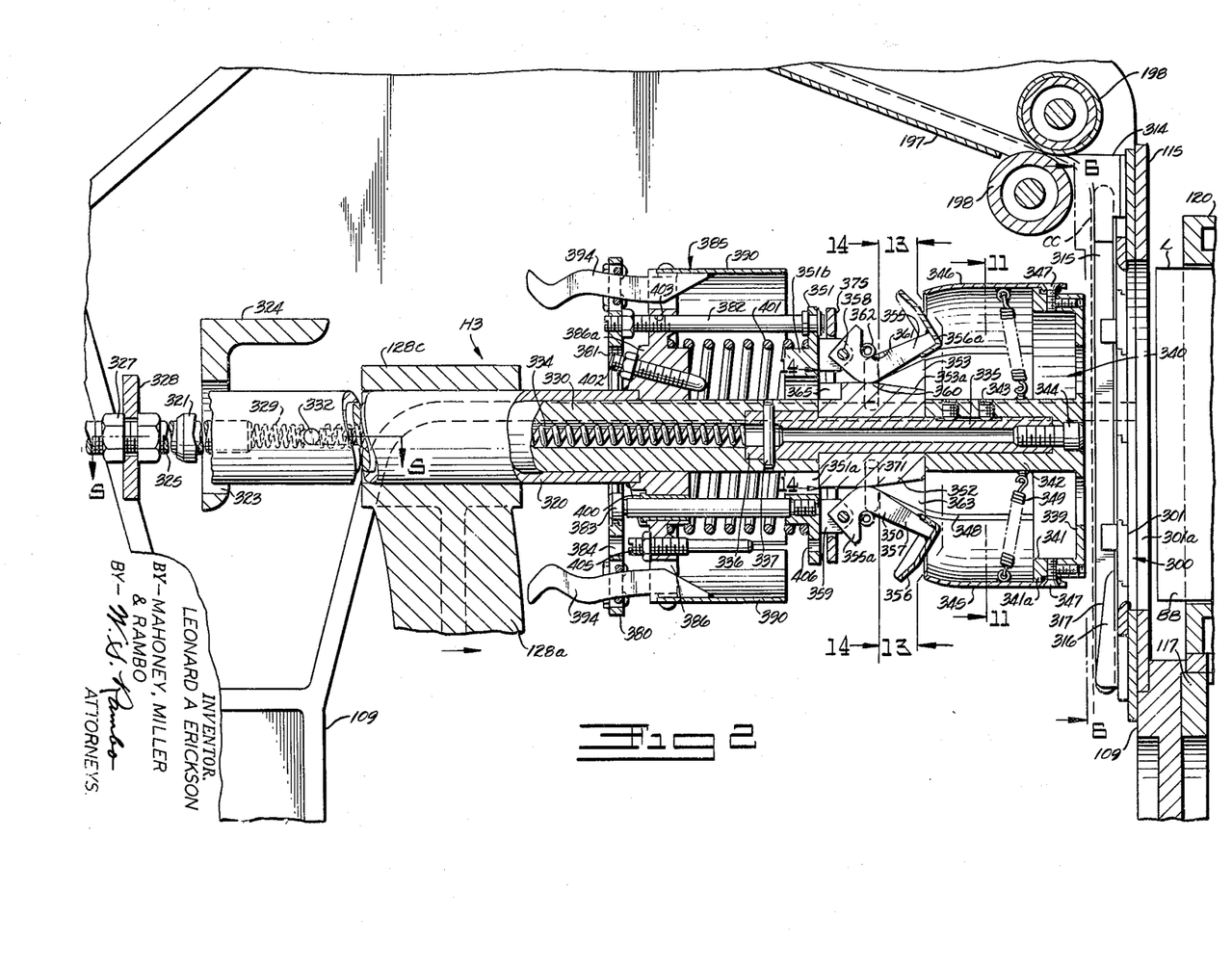
FIGURE 2 is an enlarged vertical or axial sectional view taken along line 2—2 of FIGURE 1 through the improved head mechanism of this invention which inserts the crown into the band of the cap and folds the adjacent edges of the crown and the band together, the mechanism being shown in its inital position before insertion into the nest or mold containing the cap band blank.

With particular reference to FIGURE 2, the inclined surface 197, down which the length of crown material slides, is shown and the sheet timing and feeding rollers 198 are also shown. The crown blank CC is dropped edgewise downwardly from the rollers 198 to a point between and in registry with the head H₃ and the aligning mold 120 of the turret 117. At this time, the crown blank CC is associated with a crown support and guide ring 300 which is between it and the mouth of the mold or nest 120, as shown in FIGURE 2.

It is desirable that the throat or central opening 301 in the ring 300 be of an accurate size and be just slightly larger in diameter than the mold 120. Also, it is desirable that the ring be yieldable radially outwardly and, therefore, the ring is made of segments so that it can flex radially outwardly, if necessary. The funnel guide and ring structure is shown best in FIGURES 2 and 6 to 10, inclusive.

Figure 10:
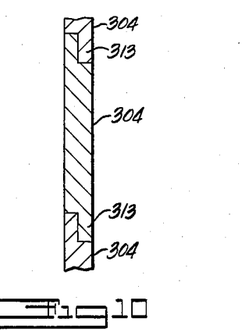
FIGURE 10 is an enlarged detail in section through the crown-sheet guide ring along line 10—10 of FIGURE 6 showing adjacent overlapping segments thereof.
Figure 11:
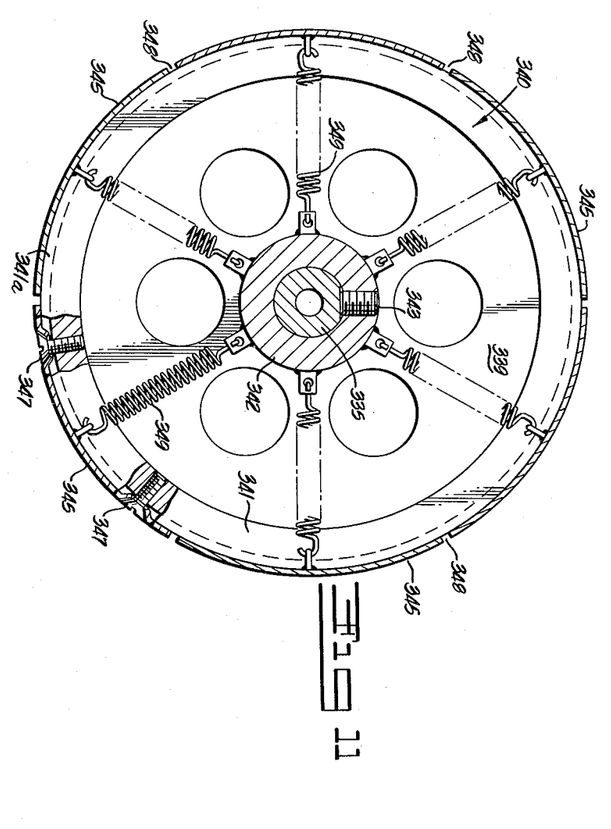
FIGURE 11 is an enlarged transverse vertical sectional view taken through the crown blank inserting and folding head along the line 11—11 of FIGURE 2, showing the pleating assembly thereof.
Figure 12:
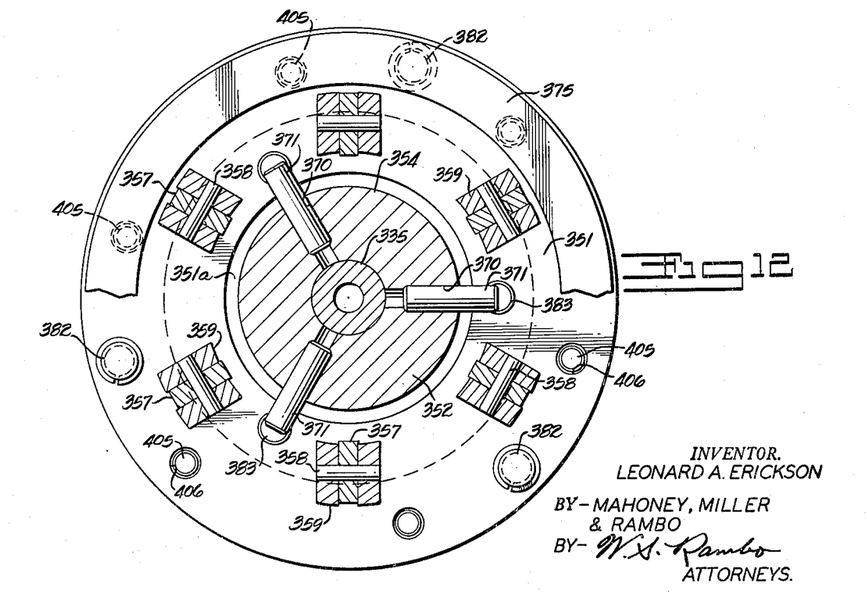
FIGURE 12 is an enlarged transverse vertical sectional view taken through the crown blank inserting and folding head along the line 12—12 of FIGURE 4 through the hold-down shoe assembly and associated operating cam structure.

The ring is formed on a plate 302 which is of segmental form at its lower side and straight at its upper side and which is suitably attached by means of the bolts 303 to a frame plate 115 carried by the frame section 109 in the position shown in FIGURE 2. The plate 115 is described in said patent and is located between the head H₃ and the turret having an opening 301a aligning with the head and the associated mold 120. The ring is formed from the segments 304. Each segment 304 has a mounting lug 305 extending radially outwardly therefrom. Each segment 304 and its lug 305 bear against the face surface of the plate 302 adjacent the opening 301a in the plate 115 which is slightly larger than the throat 301 provided by the segments 304. The lug 305 of the segment 304 is attached to the plate 302 for radial sliding movement thereon by means of screws 307 and a hold-down strip 308, each of the screws carrying a spacer bushing 309. One of the screws and bushings is disposed in an inner radial slot 310 and the other in an outer radial slot 311, both of which are formed in the lug 305. In the slot 311 is a compression spring 312 which acts normally to force the segment 304 radially inwardly but will permit it to yield radially outwardly. The inner edge of each segment 304 is curved at 304a, so that the segments provide a flared throat toward the mold 120 or in the direction of movement of the head H₃ toward the mold. As indicated in FIGURE 10, the segments 304 are provided with reduced side edges at 313 which overlap with corresponding reduced edges on adjacent segments.

Figure 6:
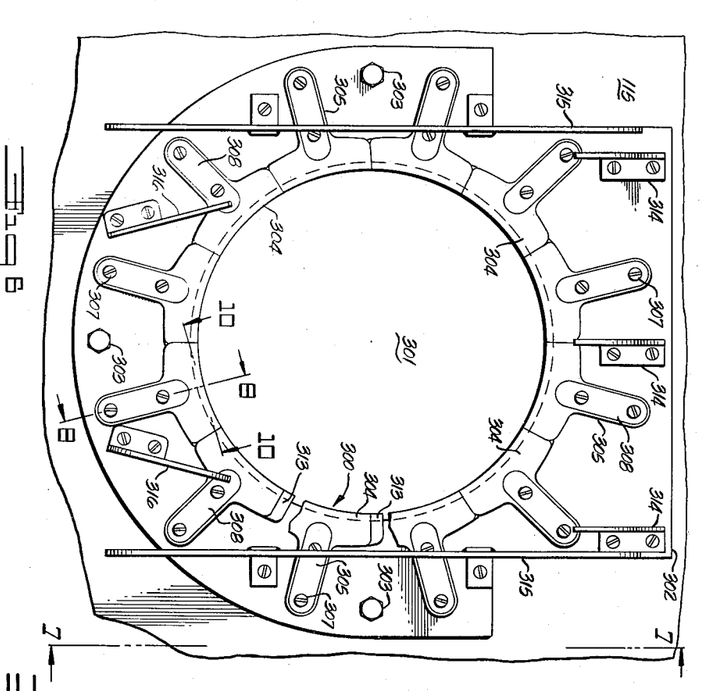
FIGURE 6 is an elevational view taken along line 6—6 of FIGURE 2 looking into the crown-sheet or blank support and guide ring or throat which guides the crown sheet or blank into the mold containing the cap band blank.
Figure 7:
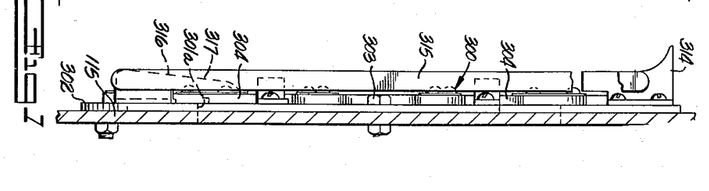
FIGURE 7 is a vertical sectional view taken along line 7—7 of FIGURE 6.
Figure 8:
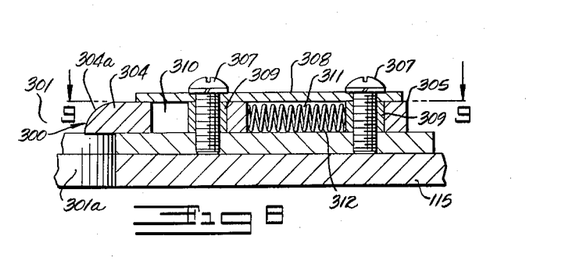
FIGURE 8 is an enlarged detail in section taken through the crown sheet or blank guide ring along line 8—8 of FIGURE 6 showing the yieldable mounting of segments thereof.
Figure 9:
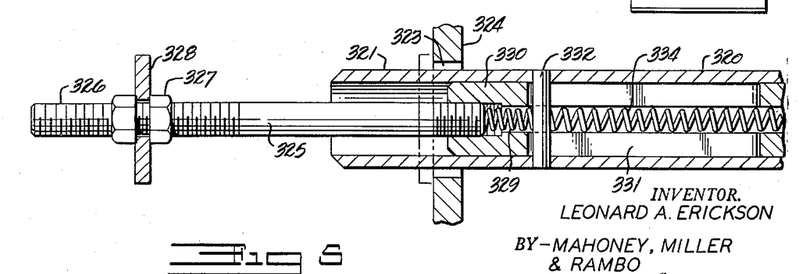
FIGURE 9 is a sectional view taken along line 9—9 of FIGURE 8.

At its upper edge the plate 302 has attached thereto guide brackets 314 which provide downwardly curved guides for directing the crown blank CC from the rollers 198 to a position between the vertical guide ribs 315. These ribs 315 are disposed in parallel relationship on the plate 302 at that side toward the head H₄. Adjacent the lower ends of the guide ribs 315 and inwardly within such ribs are guide brackets 316 which are attached to the face of the plate 302 and are angled inwardly toward each other, as shown in FIGURE 6. These brackets 316 are so formed and attached to the face of the plate 302 that they provide downwardly and outwardly angled guide edges 317 at the face of the plate for guiding the lower edge of the crown blank CC, as shown in FIGURE 2. As the crown blank CC leaves the timing rollers 198, it will be directed downwardly by the curved guides 314 between the vertical guide ribs 315 and will engage the edges 317. Members 314 and members 316 will thus keep the descending blank CC from snagging on the members 307, 308 and 303.

The head H₃, as shown in FIGURE 2, is carried by the bracket 128a which, as described in said patent, is supported ultimately by the frame sections 109 for axial reciprocation relative to the turret 117 while it is aligned with one of the molds or nests 120.

The head H₃ comprises a tubular guide member 320 (FIGURES 2, 3 and 4) which is non-rotatably mounted and axially fixed in a tubular socket 128c at the upper end of the reciprocably mounted bracket 128a and extends forwardly and rearwardly from this socket 128c. The rear or outer end 321 of the tubular member 320 is positioned in an opening 323 in an angle member 324 which is rigid with the frame sections 109. A stop rod 325 (FIGURE 5) extends from the rear or outer end 321 of the member 320 and is threaded at its outer end 326 to receive clamp nuts 327 at opposite sides of a stop washer 328, so that the washer can be set at different positions along the rod. The inner or forward end of this rod is threaded into a supporting tubular rod 330 which is mounted for axial movement in the sleeve guide 320. Forward movement of the rod 325 will be limited by contact of the washer 328 with the member 324, it being apparent that the washer 328 is of larger diameter than the opening 323 in the member 324. At the inner end of the rod 325 is a cushion spring 329 which is disposed between it and a pin 332.

The member 330 is connected to the member 320 for limited axial movement therein. Thus, the member 330 is provided with a slot 331 which extends longitudinally thereof and transversely therethrough and the member 320 carries the pin 332 which extends transversely through the slot 331. This pin and slot connection between the members 320 and 330 will permit limited axial movement of these members as well as maintain radial registry between the related parts.

A compression spring 334 is disposed within the bore in the rod member 330 and has one end bearing against the pin 332 and its other end bearing against the inner end of a tubular rod extension member 335 mounted on the forward end of the rod 330. This spring 334 will thus force the member 330 forwardly or out of the guide sleeve 320 until the pin 332 is in the rear end of the slot 331, as shown in FIGURE 5. The rod extension 335 has an enlarged inner end 336 mounted in a socket at the forward end of the rod 330 and secured therein by means of a transverse dowel pin 337. The rod 330 with the extension 335 will initially be in the position shown in FIGURE 2, that is, outwardly or forwardly extended relative to the guide sleeve 320.

The forward end of the rod extension 335 has mounted thereon a pusher and pleating assembly 340 shown in FIGURES 2 to 4 and 11 and which includes a mounting drum-like member 339 having a rearwardly directed peripheral flange 341. The drum-like member 339 is provided with a hub 342 which slips over the outer end of the rod member 335 and is held axially thereon by a cap screw 344 threaded into the outer end of the rod extension 335 and is prevented from rotating thereon by set screws 343 threaded through the hub into engagement with the member 335.

The flange 341 of the drum 339 carries a plurality of segmental pleating shoes 345 which extend rearwardly and have slightly inwardly curved rear ends 346. The forward ends of these shoes are flexibly attached to the drum flange 341 by screws 347 which have heads loosely fitting into countersunk sockets in the adjacent forward ends of the shoes. The shoes 345 are made of metal and form a flexible annulus or tube (FIGURES 2 and 11) having the slots 348 between the adjacent segments. When the segments are close together, the annulus is of a diameter less than that of the ring mouth 301 and the cavity in the mold 120, as shown in FIGURE 2. Each segment 345 is normally pulled radially inwardly by means of a tension spring 349 connected thereto at the inner surface thereof and connected to the hub 342. An annular shoulder 341a on the ring 341 limits the inward movement of the shoes 345, as indicated in FIGURE 2.

Directly behind the pusher and pleating assembly 340 is a hold-down shoe assembly 350. This assembly is shown best in FIGURES 2 and 12 to 16, and includes the shoe-support ring 351 which is mounted for axial movement relative to a hub-like shoe cam 352 rotatably mounted on the rod extension 335. The forward end of the cam 352 engages with the rear end of the hub 342 of the assembly 340 and its rear end engages with the forward or outer end of the rod 330. The cam 352 is provided with an outwardly flared forward end 353 and a rear reduced end 354 which is aligned with an opening 351a in the ring 351 which is larger than the rear end of the cam so that the ring 351 can move axially forwardly over the cam.

The ring 353 carries a plurality of radially swingable hold-down shoe members 355 (FIGURES 2 to 4 and 12). Each of these shoes comprises a shoe portion 356 which is welded on the outer end of a bellcrank portion 357. The inner or rear end of each bellcrank portion 357 is pivoted at 358 between a pair of forwardly projecting lugs 359 on the ring 351 and each bellcrank is provided with an outwardly extending ear 355a. Each bellcrank 357 is further shaped to provide a curved cam-engaging inner edge 360 and an opposed angular edge 361. Disposed around the bellcranks 357 in the angles thereof is a garter spring 362 which serves to draw all the shoe members 355 inwardly so that the cam edges 360 thereof always contact the cam member 352. Each shoe portion 356 is welded to the outer end of the associated bellcrank 357 and extends substantially at right angles to the outer end thereof having an inturned extremity 356a. When swung radially outwardly as far as possible, the segmental shoe portions 356 cooperate to provide an annulus or ring-like shoe assembly.

The surface of the forwardly flared portion 353 of the cam is provided with cam slots 363 (FIGURES 2 to 4, 13 and 14), equal in number to the bellcranks 357, and open at their front and rear ends but the rear reduced portion 354 of the cam is unslotted. The slots 363 extend angularly in the flared surface 353 of the cam relative to the axis thereof and also extend inwardly toward the axis thereof. Thus, there are provided outwardly flared ribs 353a alternating with slots 363 which have bottom surfaces 363a which extend forwardly and inwardly toward the axis of the cam 352. Thus, the ribs 353a provide outwardly directed cam surfaces and the slot bottoms 363a provide inwardly directed cam surfaces. The rear end of the cam 352 is provided with a rearwardly opening, chordally extending pocket in which an angularly directed cam surface 365 is formed, for rotating the cam 352 on the rod extension 335, as will be later explained.

Figure 13:
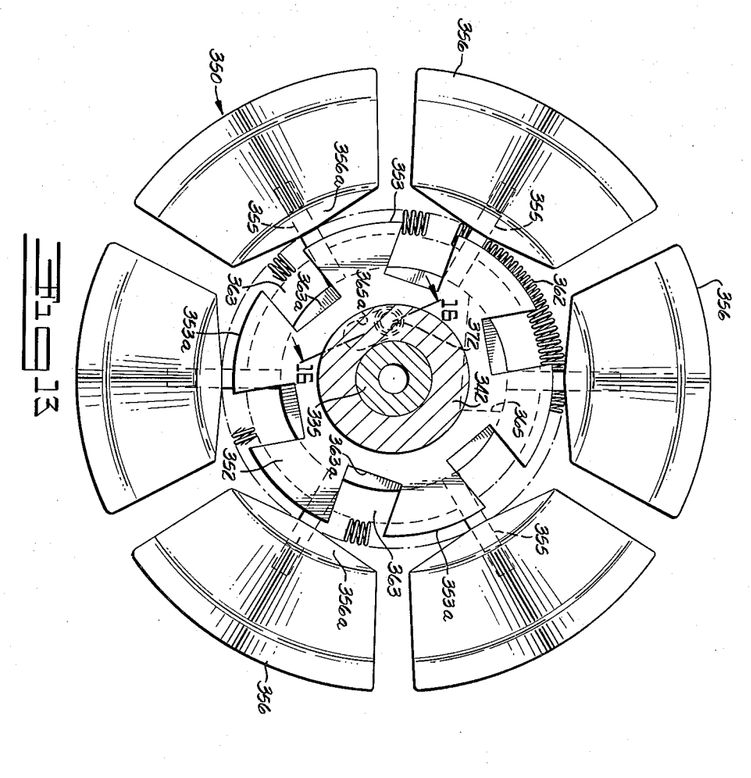
FIGURE 13 is an enlarged transverse vertical sectional view taken through the head along the line 13—13 of FIGURE 2 also showing the hold-down shoe assembly.
Figure 14:
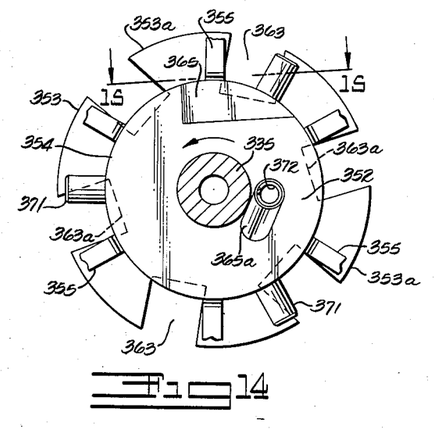
FIGURE 14 is a schematic enlarged transverse vertical sectional view taken through the head along the line 14—14 of FIGURE 2 showing details of the hold-down shoe assembly and associated actuating cam.
Figure 15:
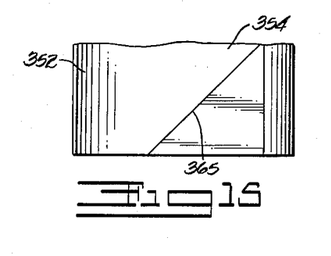
FIGURE 15 is a detail in enlarged section taken along the line 15—15 of FIGURE 14.

The rear portion 354 of the cam member 352 is further provided with radial bores 370 (FIGURE 12) in which are disposed stop pins 371 which project radially from the surface thereof. These pins serve as stop pins to limit forward axial movement of the shoe-carrying ring 351 relative to the cam 352 and it will be noted from FIGURE 12 that they are disposed angularly between pairs of adjacent lugs 359 on the ring 351. As previously indicated, the cam surface 365 is used in rotating the cam 352 relative to the ring 351 and this rotation will be in a counterclockwise direction as indicated by the arrow in FIGURE 14. To return the cam 352 to its original position at the proper time, as will be explained later, the structure illustrated in FIGURES 13, 14 and 16 is provided. This structure comprises a coil spring 372 provided in a bore in the forward end of the rod member 330 and which projects forwardly into a pocket in the rear end of the cam 352 which has a cam surface 365a that angles in a direction the reverse of the cam surface 365 previously mentioned and shown in FIGURE 15. As will be later apparent, when the cam 352 is rotated counterclockwise (FIGURE 14) by means including the cam surface 365, the spring 372 is engaged by the surface 365a and will be bent and, as soon as the counterclockwise rotative force is released from the cam 352, this bent spring 372 will cooperate with the surface 365a to rotate the cam 352 in a reverse or clockwise direction to return the cam to its original position indicated in FIGURE 2.

Figures 18, 19, 20:
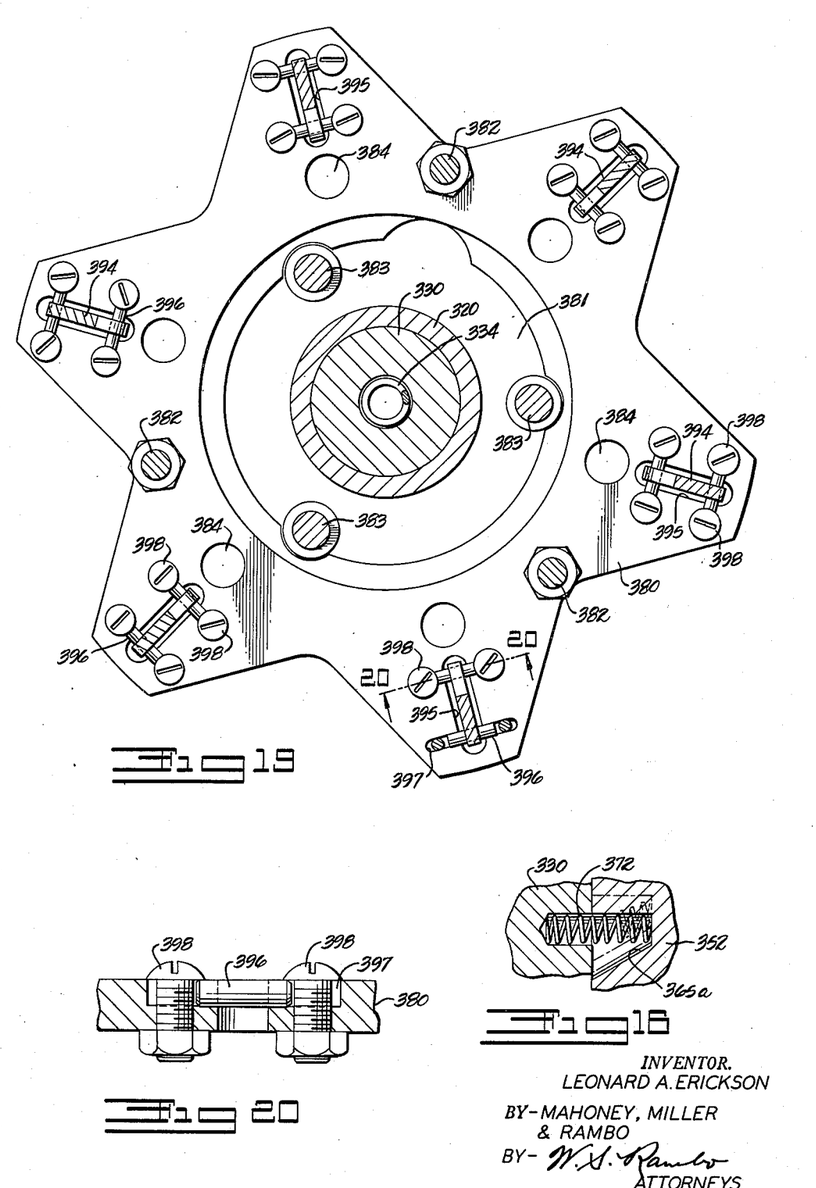
FIGURE 19 is an enlarged transverse vertical sectional view taken along the line 19—19 of FIGURE 4 through the crown inserting and folding head, showing the pick-up plate actuating cam thereof.
FIGURE 20 is an enlarged detail in section taken along the line 20—20 of FIGURE 19.
Figure 21:
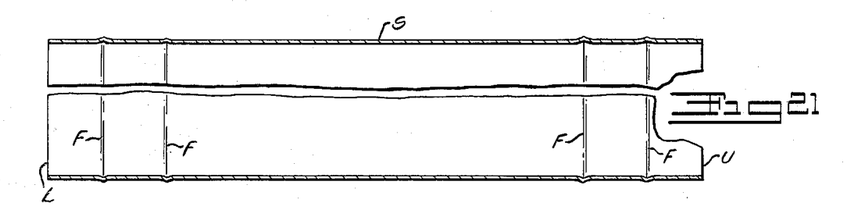
FIGURE 21 is a schematic sectional view through an annular paper cap band blank showing it scored and before folding to complete the cap band.

Carried by the ring 351 around the lugs 359 thereon is a floating ring 375 (FIGURES 2 to 4 and 12). The ring 375 is carried on the lugs 359 for limited axial movement thereon relative to the ring 351. Also carried by the ring 351 rearwardly thereof is a pick-up cam plate 380 which is substantially star-shaped, as shown in FIGURE 19, and which surrounds the forward end of the guide 320, as shown in FIGURE 2, having a central opening 381 larger than the guide 320. The ring 351 is connected to the cam plate 380 as a unit by means of the longitudinally extending angularly spaced connecting or tie rods 382 which are adjustable as indicated to accurately space the members 380 and 351. Thus, the members 351 and 380 will be joined together as a single unit. The member 380 is also provided with a plurality of angularly spaced openings 384, the purpose of which will be apparent later.

Mounted between the ring 351 and the ring 380 so that they may move axially thereof is a pick-up plate assembly 385. This assembly includes a disc 386, which is shown best in FIGURES 2 to 4 and 17, and which is provided with a hub 386a that surrounds the rod 330 and fits over the outer end of the guide 320 to which it is welded. Attached to the peripheral edge of the disc 386 are a plurality of pick-up plates 390 which extend longitudinally, being segments of a cylinder in form, and which, in combination, produce a cylinder having slots 391 between the segments thereof. Each segment 390 is of metal and is flexibly fastened at its rear end to the edge of the disc 386 by means including a pair of radially extending screws 392 which are on opposite sides of an outwardly opening notch 393 in the edge of the disc 386 and are locked in place in such edge by set screws 392a. Each of these notches 393 receives a cam arm 394 which has its forward end rigidly attached to the inner surface of the segmental plate 390 and its rear end extending through a radially elongated opening 395 in the cam plate 380. As shown in FIGURE 19, one of these openings 395 is in each point of the star-shaped plate. The arms 394 are flat in a radial plane and have parallel inner and outer edges of serpentine form. These edges fit snugly between a pair of cam follower pins 396 which extend across each opening 395. The pins 396 are held in sockets 397 by the bolts 398 (FIGURE 20) which are clamped in openings extending through the plate 380. Thus, the arms 394 are carried by the disc 386 and can move longitudinally relative to the cam ring 380.

Figures 17, 18:
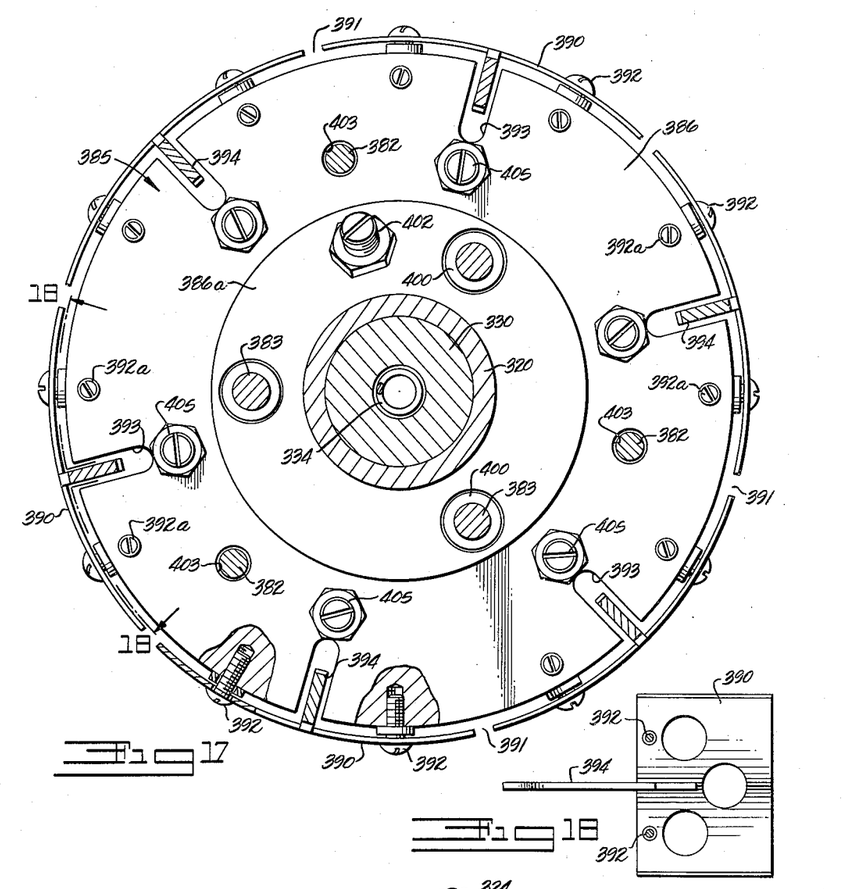
FIGURE 17 is an enlarged transverse vertical sectional view taken along the line 17—17 of FIGURE 4 through the crown inserting and folding head, showing the pick-up plate assembly thereof.
FIGURE 18 is a reduced detail in section taken along the line 18—18 of FIGURE 17 showing one of the pick-up plate members.

Bearing rods 383 are carried by the member 351 and are axially slidable in bearings 400 carried by the hub 386a of the disc 386 which carries the pick-up plates 390. The tie rods 382 slidably pass through openings 403 in the disc 386 (FIGURE 17). The members 351 and 380 are tied together as a unit by the tie rods 382 and this unit may move axially relative to the disc 386 but will not rotate relative thereto because of the rods 382 and 383 passing slidably through the openings 403 and bearings 400, respectively, in the disc 386. Between the members 351 and 386 is a large compression spring 401 which surrounds the hubs 351b and 386a, respectively, thereof. Threaded forwardly and axially inwardly in the hub 386a of the disk 386 is an adjustable cam pin 402, as shown in FIGURES 2 to 4, and 17. This pin 402 projects through the hub 386a and its forward end is adapted to contact the cam surface 365 of the cam 352 to rotate the cam relative to the disc 386 at the proper instant, as shown in FIGURE 4 and as will be explained more in detail later. Adjustably threaded forwardly through the outer part of the disc 386 are a plurality of angularly spaced pins 405 adapted to contact with the ring 375 at the proper time, as shown in FIGURE 4, passing through openings 406 in the ring 351 to make this contact. Access to the heads of the pins 405 for adjustment is possible through the openings 384 in the cam member 380.

Figure 3:
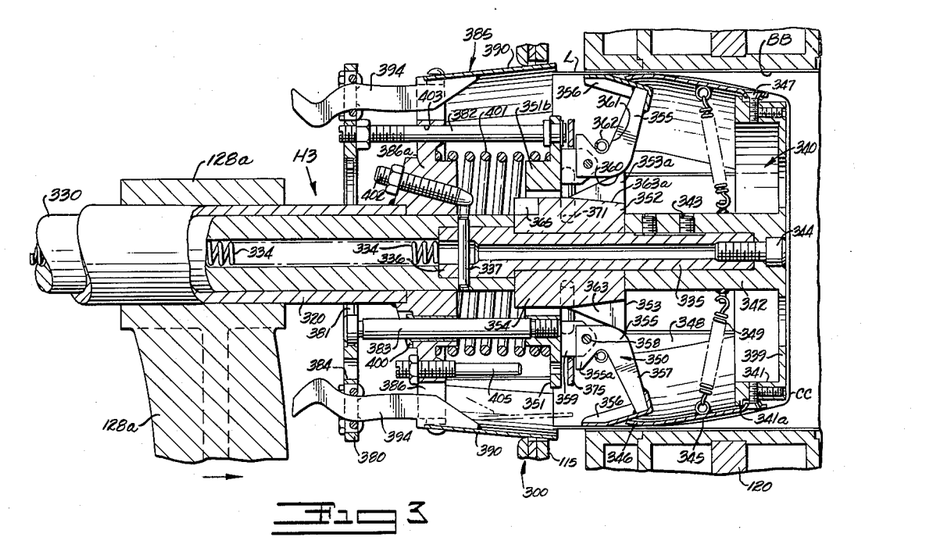
FIGURE 3 is a view similar to FIGURE 2 but showing the head mechanism inserting the cap crown blank within the cap band blank in the mold, preparatory to folding the edge of the band blank around the edge of the crown blank.
Figure 4:
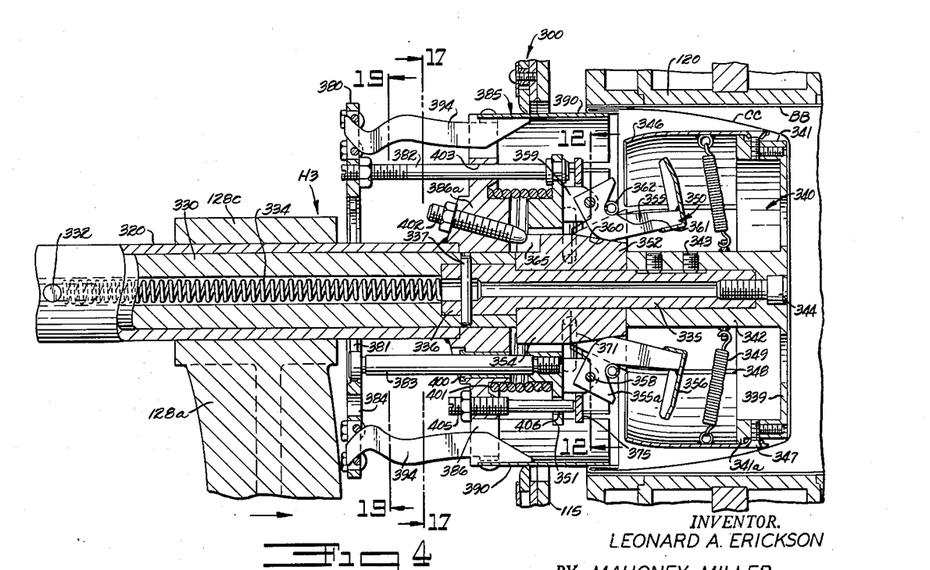
FIGURE 4 is a view similar to FIGURE 3 showing the mechanism folding the edge of the cap band blank around the crown blank.

The operation of the head $H_3$ will be understood from the following description and with particular reference to FIGURES 2, 3 and 4. The initial position of the head is shown in FIGURE 2 and assuming that one of the molds or nests 120 has been moved into alignment with the crown guide ring 300 and the head $H_3$, the head will function as described below. It will be noted from FIGURE 2 that the crown blank CC will be positioned between the head $H_3$ and the mold 120 and the blank BB will have the edge L projecting outwardly from the mold toward the head. The arm 128a will be moved toward the mold 120, as described in said patent, and the following sequence of operations will occur.

The entire head $H_3$ will be advanced with the arm 128a and the stop collar 328 will eventually strike the stop member 324. At this time, the cam pusher and pleating assembly 340 will have advanced from the position shown in FIGURE 2 where it is outside the mold 120 to the position shown in FIGURE 3 where it has reached the extent of its movement into the mold. As the assembly 340 passes through the ring 300, it pushes the crown blank CC through the ring and into the mold 120 and at the same time forms the crown into a convex structure within the band blank BB with a pleated annular skirt within the band blank, as shown in FIGURE 3, but it will be apparent that the outer edge of the pleated skirt of the crown will still be flush with the outer edge L of the portion of the cap blank which extends from the mold 120. At the time the collar 328 strikes the stop 324, the pick-up plate assembly 385 will start to advance relative to the pleating assembly 340. The disc 386 will be moved axially along the rod 330, since the rod is stopped by contacting stops 328 and 324 and the arm 128a continues its advance, thereby moving the guide 320 axially along the rod 330. Consequently, the spring 401 will be gradually compressed as indicated in FIGURE 3. Advancing movement of the disc 386 will also advance it relative to the cam ring 380 and will pull the cam arms 394 through the ring. This will first swing the pick-up plates 390 out against the flexible ring 300 and outwardly beyond the edge L of the blank BB as the pusher plates advance toward that edge, the ring expanding to permit picking up of the band blank paper. The plates will be directed outside the edge, as shown in full lines in FIGURE 3, and then will be swung inwardly, as shown by broken lines in FIGURE 3, resulting in an inward fold on the overlapping edges of the two blanks, as shown in FIGURE 4, it being understood that the edge of the crown blank has previously been positioned, as in FIGURE 3, in overlapping relationship to the edge L of the band blank. Advancing the disc 386 from the position shown in FIGURE 2 also causes the compressing spring 401 to move the ring 351 over the cam 352. This will move the hold-down shoe assembly 350 from the position shown in FIGURE 2 to an advanced position in cooperation with the pleating and pusher assembly 340, as shown in FIGURE 3. The ring 351 will be moved over the cam 352, as shown in FIGURE 3, causing the cam edges 360 of the bellcranks 355 to ride up on the outwardly flared cam ribs 353a. This will swing the bellcranks 355 outwardly against the face of the garter spring 362. This, in turn, will cause the shoes 356 to swing rearwardly and outwardly and at the same time contact the rear or trailing ends of the pleating shoes 345 and swing them outwardly against the action of the springs 349. At this time, the pleating shoes 345 will be pressing the blanks BB and CC outwardly against the wall of the mold cavity and the shoes 356 will be acting similarly but the trailing or rear ends of the shoes 356 will be at the outer corner of the mold cavity. Therefore, the pick-up plates 390 swing inwardly, they fold the blank edges around the trailing ends of the hold-down shoes 356, The advance of the ring 351 will be stopped when it contacts the pins 371 carried by the cam 352 and at this time the bellcranks 355 will be at the highest points on the cam ribs 353a.

The arm 128a will continue its advance and will continue to advance the disc 386 relative to the cam 352 although the ring 351 will be stationary. Eventually, as indicated in FIGURE 4, the cam pin 402 will strike the cam surface 365, as shown in FIGURE 4, and at this time the spring 401 will be substantially compressed. When the pin 402 strikes the cam surface 365, the cam 352 will be rotated on the rod extension 335. This turning of the cam will cause the bellcranks 355 to drop into the cam slots 363 in contact with the bottoms 363a which are angled reversely to the cam ribs 353a. This will permit the holddown shoes 356 to move inwardly to the contracted position shown in FIGURE 4 and at the same time permit the pleating shoes 345 to move inwardly to contracted position as shown in this figure. At the time the disc 386 reaches the extent of its advance, as shown in FIGURE 4, the pins have contacted the floating ring 375 and have moved forwardly from the position shown in FIGURE 3 so as to push it against the ears 355a on the bellcranks 355 to provide a positive force to insure that they swing inwardly from the position shown in FIGURE 3 to the position shown in FIGURE 4.

When the arm 128a reaches the position shown in FIGURE 4, it will begin its reverse movement. This will permit the spring 401 to expand to move the disc 386 to its rearwardmost position shown in FIGURE 2. At the same time the bellcranks 355 will be withdrawn from the slots 363 riding up the bottoms 363a thereof until they rest on the rear portion 354 of the cam 352. Then the cam will be rotated by the return spring structure 372 (FIGURE 16) so that it will be in the initial position shown in FIGURE 2. At the same time, the stop 328 will be moved rearwardly of the stop 324 by the spring 334, thus permitting the assembly 340 to be withdrawn from the mold 120 and beyond the ring 300. The pick-up plates 390 will have previously been withdrawn upon expansion of the spring 401 since they move with the disc 386 and the assembly 385 will have been retracted relative to the assembly 340 to the position shown in FIGURE 2. Thus, the head $H_3$ will be restored to the condition shown in FIGURE 2, ready for acting on the next mold 120 moved into alignment therewith by the turret 117.

It will be apparent from the above description that this invention provides a head structure $H_3$ which is completely different in structure from the head $H_3$ disclosed in the previous patent and which brings about more effective insertion of the crown blank within the cap blank and more effective folding of the adjacent edges of the blank together. With this head structure, a complete folded connection all around the band is insured and the pleating and folding of the cap blank along with the folding of the adjacent edges of these two blanks is accomplished without unsightly wrinkling or bunching of material.

Having thus described this invention, what is claimed is:

1. In combination with a machine having a mold in which a blank in the form of a coil of flexible material is disposed and having means for positioning a flat blank of flexible material in alignment therewith, a head disposed in axial alignment with said mold for inserting and folding the flat blank within the coil blank in the mold, said head comprising a radially expansible and contractible pusher and pleating assembly, a radially expansible and contractible hold-down shoe assembly mounted for axial movement into the pusher and pleating assembly, and a radially expansible pick-up plate assembly, support means for supporting said assemblies in the sequence stated axially away from the mold and the positioned flat blank, and means for moving said support means toward the mold to cause said pusher and pleating assembly to first enter the mold, said hold-down shoe assembly to enter the pusher and pleating assembly to expand it against the mold, and said pick-up plate assembly to contract inwardly so as to insert the flat blank within the coil blank in the mold to form and pleat such blank and to fold adjacent edges of the two blanks together.

2. In combination with a cap-forming machine having a mold in which a cap band blank is disposed and having means for positioning a cap crown blank in axial alignment therewith, a crown-inserting and folding head disposed in axial alignment with said mold, said head comprising a radially expansible and contractible crown pusher and pleating assembly, a radially expansible and contractible hold-down shoe assembly, and a radially expansible and contractible pick-up plate assembly, support means for supporting said assemblies in the sequence stated axially away from the mold and the positioned crown blank, and means for moving said support means toward the mold to cause said pusher and pleating assembly to first enter the mold, said hold-down shoe assembly to enter the pusher and pleating assembly to expand it against the mold, and said pick-up plate assembly to contract inwardly so as to insert the crown blank within the band blank, to form the crown and to fold adjacent edges of the two blanks together.

3. In combination with a cap-forming machine having a mold with a peripheral wall and an open mouth and adapted to have disposed therein a continuous cap band blank within the mold against the wall thereof and with its edge projecting through the mouth, means disposed in axial alignment with the mold outside the mouth thereof adapted to receive and position a cap crown blank, a crown inserting and folding head disposed in axial alignment with the mold and beyond said crown blank positioning means so that the latter is between it and the mouth of the mold, said head including a supporting rod axially aligned with the mold, a crown pusher and pleating assembly on the rod and comprising pleating shoes mounted for radial movement on the rod, a hold-down shoe assembly disposed on said rod behind said pusher and pleating assembly and comprising hold-down shoes mounted for radial movement on the rod, a pick-up plate assembly disposed on said rod behind said hold-down shoe assembly and comprising plates mounted for radial movement on the rod, means for advancing said supporting rod toward the mold to cause the pusher and pleating assembly to advance and first engage the positioned crown blank and to move it into the band blank within the mold with a projecting edge overlapping the projecting edge of said band blank, and means cooperating with said rod to advance said hold-down shoe assembly relative to said pusher and pleating assembly and to move the hold-down shoes outwardly to engage the pleating shoes and force them into contact with the blanks and press them against the wall of the mold and to advance the pick-up plate assembly relative to said hold-down shoe assembly so that the pick-up plates first move around the projecting blanks and then move radially inwardly to fold the projecting blank edges radially inwardly and into the mold against the mouth thereof.

4. In combination with a cap-forming machine having a mold with a peripheral wall and an open mouth and adapted to have disposed therein a continuous cap band blank within the mold against the wall thereof and with its edge projecting through the mouth, means disposed in axial alignment with the mold outside the mouth thereof adapted to receive and position a cap crown blank, a crown inserting and folding head disposed in axial alignment with the mold and beyond said crown blank positioning means so that the latter is between it and the mouth of the mold, said head including a supporting rod axially aligned with the mold, a crown pusher and pleating assembly on the rod and comprising pleating shoes mounted for radial movement on the rod, yieldable means normally drawing said pleating shoes radially inwardly, a hold-down shoe assembly disposed on said rod behind said pusher and pleating assembly and comprising holddown shoes mounted for radial movement on the rod, yieldable means for normally drawing said hold-down shoes radially inwardly, a pick-up plate assembly disposed on said rod behind said hold-down shoe assembly and comprising plates mounted for radial movement on the rod, cam arms attached to said plates, means for advancing rod supporting rod toward the mold to cause the pusher and pleating assembly to advance and first engage the positioned crown blank and to move it into the band blank within the mold, and means cooperating with said rod to advance said hold-down shoe assembly relative to said pusher and pleating assembly and to move the hold-down shoes outwardly to engage the pleating shoes and force them into contact with the blanks and press them against the wall of the mold, said advancing means including a cam on the rod for engaging said hold-down shoes to force them radially outwardly, and a ring mounted on said rod for axial movement relative to the cam and connected to said hold-down shoes, and means cooperating with said rod to advance the pick-up plate assembly relative to said hold-down shoe assembly and a cam member on said rod cooperating with said cam arms and mounted for limited axial advancing movement on said rod, so that the pick-up plates first move around the projecting blanks and then move radially inwardly to fold the projecting blank edges radially inwardly and into the mold against the mouth thereof.

5. In combination with a cap-forming machine having a mold with a peripheral wall and an open mouth and adapted to have disposed therein a continuous cap band blank within the mold against the wall thereof and with its edge projecting through the mouth, means disposed in axial alignment with the mold outside the mouth thereof adapted to receive and position a cap crown blank, a crown inserting and folding head disposed in axial alignment with the mold and beyond said crown blank positioning means so that the latter is between it and the mouth of the mold, said head including a supporting rod axially aligned with the mold, a crown pusher and pleating assembly fixed axially on the rod and comprising pleating shoes mounted for radial movement on the rod, yieldable means normally drawing said pleating shoes radially inwardly, a hold-down shoe assembly disposed on said rod behind said pusher and pleating assembly for axial movement on the rod and comprising hold-down shoes mounted for radial movement on the rod, yieldable means for normally drawing said hold-down shoes radially inwardly, a pick-up plate assembly disposed on said rod behind said hold-down shoe assembly for axial movement thereon and comprising plates mounted for radial movement on the rod, cam arms attached to said plates, means for advancing said supporting rod toward the mold to cause the pusher and pleating assembly to advance and first engage the positioned crown blank and to move it into the band blank within the mold, and means cooperating with said rod to advance said hold-down shoe assembly relative to said pusher and pleating assembly and to move the hold-down shoes outwardly to engage the pleating shoes and force them into contact with the blanks and press them against the wall of the mold, said advancing means including a cam on the rod for engaging said hold-down shoes to force them radially outwardly and a ring mounted on said rod for axial movement relative to the cam and connected to said hold-down shoes, means cooperating with said rod to advance the pick-up plate assembly relative to said hold-down shoe assembly, and a cam member on said rod cooperating with said cam arms and mounted for limited axial advancing movement on said rod but being in a fixed axial position relative to said ring so that the pick-up plates first move around the projecting blanks and then move radially inwardly to fold the projecting blank edges radially inwardly and into the mold against the mouth thereof.

6. In combination with a cap-forming machine having a mold with a peripheral wall and an open mouth and adapted to have disposed therein a continuous cap band blank within the mold against the wall thereof and with its edge projecting through the mouth, means disposed in axial alignment with the mold outside the mouth thereof adapted to receive and position a cap crown blank, a crown inserting and folding head in axial alignment with the mold and beyond said crown blank positioning means so that the latter is between it and the mouth of the mold, said head including a supporting rod axially aligned with the mold, a crown pusher and pleating assembly fixed axially on the rod and comprising a supporting pusher member having pleating shoes thereon directed rearwardly but being mounted for radial swinging movement thereon, yieldable means for normally drawing said pleating shoes radially inwardly, a hold-down shoe assembly disposed on said rod behind said pusher and pleating assembly for axial movement on the rod into cooperation with said pusher and pleating assembly and comprising a member carrying hold-down shoes for radial swinging movement with the hold-down shoes directed outwardly and rearwardly, yieldable means for normally drawing said hold-down shoes radially inwardly, said shoe-carrying member being mounted for axial movement on the rod relative to said supporting pusher member, a cam member in fixed axial position on said rod behind said supporting pusher member and engaging said hold-down shoes so that when the member which carries them moves axially relative to said cam the hold-down shoes are swung radially outwardly and engage said pleating shoes to swing them radially outwardly, a second cam member surrounding said rod and attached in a fixed axial position to said member which carries said hold-down shoes, and a pick-up plate assembly disposed between said second cam member and said hold-down shoe carrying member surrounding said rod and being axially moveable relative to said members, said pick-up plate assembly comprising a support member mounted for axial movement on the rod between said hold-down shoe carrying member and said second cam member, said support member having pick-up plates supported thereby extending forwardly therefrom, said pick-up plates being mounted for radial swinging movement and having cam arms rigidly connected thereto, said cam arms extending rearwardly into cooperation with said second cam.

7. The combination of claim 6 in which said first cam is rotatably mounted on said supporting rod, said cam having alternate ribs and slots for cooperating with said hold-down shoes, and means for rotating said first cam on the rod.

8. The combination of claim 7 in which said rotating means comprises a cam surface on the first cam and means carried by said pick-up plate support member for engaging said surface.

9. The combination of claim 8 including yieldable means between said first cam and said hold-down plate carrying member for returning the cam to its original position, said last-named member being connected to said pick-up plate support member for axial but non-rotative movement relative thereto.

10. The combination of claim 9 including a compression spring around said supporting rod between said pick-up plate support member and said hold-down shoe carrying member.

11. The combination of claim 10 including a guide in which said supporting rod is mounted for axial movement, yieldable means for urging said rod forwardly of said guide, a stop member on said rod for engaging a fixed stop to limit forward movement of said rod, and a reciprocable member carrying said rod for reciprocating it relative to said mold.

12. In combination with a cap-forming machine having a mold with a peripheral wall and an open mouth and adapted to have disposed therein a continuous cap band blank within the mold against the wall thereof and with its edge projecting through the mouth, means disposed in axial alignment with the mold outside the mouth thereof adapted to receive and position a cap crown blank, a crown inserting and folding head in axial alignment with the mold and beyond said crown blank positioning means so that the latter is between it and the mouth of the mold, said head including a supporting rod axially aligned with the mold, a crown pusher and pleating assembly fixed axially on the rod and comprising a supporting pusher drum member having pleating shoes mounted on the circumference thereof and directed rearwardly but being mounted for radial swinging movement thereon, yieldable means for normally drawing said pleating shoes radially inwardly, a hold-down shoe assembly disposed on said rod behind said pusher and pleating assembly for axial movement on the rod into cooperation with said pusher and pleating assembly and comprising a ring member carrying hold-down shoes for radial swinging movement with the hold-down shoes directed outwardly and rearwardly, yieldable means for normally drawing said hold-down shoes radially inwardly, said shoe-carrying ring member being mounted for axial movement on said rod relative to said supporting pusher drum, a cam member in fixed axial position on said rod behind said supporting pusher member and engaging said hold-down shoes so that when the ring member which carries them moves axially relative to said cam, the hold-down shoes are swung radially outwardly and engage said pleating shoes to swing them radially outwardly, stops carried by said cam for limiting movement of said ring member, a second cam member in the form of a plate surrounding said rod and attached in a fixed axial position to said first ring which carries said hold-down shoes, and a pick-up plate assembly disposed between said cam plate and said hold-down shoe carrying ring surrounding said rod and being axially movable relative to said ring and said cam plate, said pick-up plate assembly comprising a support disk mounted for axial movement on the rod between said hold-down shoe carrying ring and said cam plate, said hold-down shoe carrying ring and cam plate being connected together in fixed axial position by rods extending through openings in said disk, said support disk having pick-up plates supported thereby extending forwardly therefrom, said pick-up plates being mounted for radial swinging movement and having cam arms rigidly connected thereto, said cam arms extending rearwardly through cam slots in said cam plate.

13. The combination of claim 12 including a compression spring between said pick-up plate supporting disk and said hold-down shoe carrying ring.

14. The combination of claim 13 in which said first cam has alternate ribs and slots for cooperating with said hold-down shoes, and means for rotating said first cam in one direction upon movement of the hold-down shoe carrying ring axially into association therewith and in the opposite direction upon return of said ring.

15. The combination of claim 14 in which the ribs and slots have cam surfaces reversely inclined.

16. The combination of claim 15 in which the means for rotating the first cam in one direction comprises a pin carried by said pick-up plate support disk and a cam surface carried by said first cam, and the means for rotating said first cam in the opposite direction comprises a spring extending from the hold-down shoe-carrying ring into an inclined slot in the first cam.

17. The combination of claim 12 in which the slots in said cam plate extend radially thereof and said cam arms connected to said pick-up plates are flat in a radial direction, said arms having inner and outer parallel cam edges of serpentine form.

18. The combination of claim 12 in which said supporting rod is carried in a guide sleeve for axial movement relative thereto, and a spring connected between the said rod and the guide sleeve for projecting the rod forwardly relative to the sleeve.

19. The combination of claim 18 in which the guide sleeve is carried by a member reciprocable relative to said mold.

20. The combination of claim 19 in which said axially movable supporting rod has a stop that cooperates with a stop member in fixed position relative to said member.

21. The combination of claim 12 in which said pick-up plate supporting disk is provided with pins for engaging a second ring carried by said ring which carries said hold-down shoes, said second ring being mounted for axial floating movement on said shoe-supporting ring, said second ring being engageable with said hold-down shoes to swing them inwardly on said shoe-carrying ring.

22. The combination of claim 12 in which said pleating shoes, said hold-down shoes, and said pick-up plates are in segmental form and are arranged to provide annular structures for engaging the cap blanks.

23. The combination of claim 12 in which said cap blank positioning means comprises a ring having a throat, and guides for receiving and positioning the blank over the throat.

24. The combination of claim 23 in which the throat is formed of outwardly yieldable segments.

References Cited in the file of this patent

UNITED STATES PATENTS

| | | |
|---|---|---|
| 365,575 | Campbell | June 28, 1887 |
| 2,087,158 | Lindsey | July 13, 1937 |
| 2,313,628 | DeVillers | Mar. 9, 1943 |
| 2,542,676 | Hunter | Feb. 20, 1951 |